United States Patent
Prenn et al.

(10) Patent No.: US 9,645,823 B2
(45) Date of Patent: May 9, 2017

(54) HARDWARE CONTROLLER TO CHOOSE SELECTED HARDWARE ENTITY AND TO EXECUTE INSTRUCTIONS IN RELATION TO SELECTED HARDWARE ENTITY

(75) Inventors: Mary T. Prenn, Star, ID (US); Bradley R. Larson, Meridian, ID (US); Russell Fredrickson, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1621 days.

(21) Appl. No.: 13/040,000

(22) Filed: Mar. 3, 2011

(65) Prior Publication Data
US 2012/0226893 A1    Sep. 6, 2012

(51) Int. Cl.
*G06F 9/38*    (2006.01)

(52) U.S. Cl.
CPC .............. *G06F 9/38* (2013.01); *G06F 9/3877* (2013.01); *G06F 9/3889* (2013.01)

(58) Field of Classification Search
None
See application file for complete search history.

(56) References Cited

U.S. PATENT DOCUMENTS

| | | | |
|---|---|---|---|
| 4,027,290 A | 5/1977 | Subrizi et al. | |
| 4,679,169 A | 7/1987 | de la Salle et al. | |
| 5,070,447 A | 12/1991 | Koyama | |
| 5,410,708 A | 4/1995 | Miyamori | |
| 5,539,883 A * | 7/1996 | Allon et al. | 718/105 |
| 5,551,044 A | 8/1996 | Shah et al. | |
| 5,564,117 A | 10/1996 | Lentz et al. | |
| 5,634,135 A | 5/1997 | Hollander | |
| 5,701,482 A * | 12/1997 | Harrison et al. | 718/105 |
| 5,721,921 A | 2/1998 | Kessler et al. | |
| 5,812,858 A | 9/1998 | Nookala et al. | |
| 5,901,321 A | 5/1999 | Kim et al. | |
| 6,081,867 A | 6/2000 | Cox | |
| 6,256,659 B1 | 7/2001 | McLain et al. | |

(Continued)

FOREIGN PATENT DOCUMENTS

| | | |
|---|---|---|
| EP | 0469543 | 2/1992 |
| JP | 1214939 | 8/1989 |

(Continued)

OTHER PUBLICATIONS

Miodrag Potkonjak et al, Cost Optimization in Asic Implementation of Periodic Hard-real Time Systems Using Behavioral Synthesis Techniques (Research Paper), C&C Research Laboratories, NEC USA, Princeton, NJ 08540, 6 Pages.

(Continued)

*Primary Examiner* — Corey S Faherty
(74) *Attorney, Agent, or Firm* — Michael A. Dryja

(57) ABSTRACT

A hardware controller includes a first hardware interface, a second hardware interface, first hardware logic, and second hardware logic. The first hardware interface is to couple the hardware controller to hardware entities of a hardware device in which the hardware controller is to be included. The second hardware interface is to couple the hardware controller to a memory to receive instructions. The first hardware logic is to choose a selected hardware entity from the hardware entities. The second hardware logic is to execute the instructions in relation to the selected hardware entity.

8 Claims, 5 Drawing Sheets

(56) References Cited

U.S. PATENT DOCUMENTS

| | | |
|---|---|---|
| 6,449,675 B1 | 9/2002 | Moyer et al. |
| 6,539,448 B1 | 3/2003 | Deng |
| 6,845,419 B1 | 1/2005 | Moyer |
| 7,206,924 B2 | 4/2007 | Boles et al. |
| 7,991,909 B1 | 8/2011 | Schumacher et al. |
| 8,271,980 B2 | 9/2012 | Jackson |
| 8,271,987 B1 | 9/2012 | Willeford |
| 2004/0153650 A1 | 8/2004 | Hillmer |
| 2005/0193157 A1 | 9/2005 | Kwon et al. |
| 2007/0124363 A1 | 5/2007 | Lurie et al. |
| 2007/0300223 A1 | 12/2007 | Liu |
| 2008/0091867 A1 | 4/2008 | Plondke et al. |
| 2008/0189716 A1 | 8/2008 | Nakahara |
| 2009/0037926 A1 | 2/2009 | Dinda et al. |
| 2009/0049443 A1 | 2/2009 | Powers et al. |
| 2009/0210660 A1 | 8/2009 | Webber |
| 2009/0248935 A1 | 10/2009 | Ehrlich et al. |
| 2010/0199278 A1 | 8/2010 | Tomita |
| 2011/0041127 A1 | 2/2011 | Kohlenz et al. |
| 2011/0161955 A1 | 6/2011 | Woller |
| 2012/0226893 A1 | 9/2012 | Prenn et al. |
| 2012/0227052 A1 | 9/2012 | Larson et al. |

FOREIGN PATENT DOCUMENTS

| | | |
|---|---|---|
| JP | 2009163658 | 7/2009 |
| JP | 2009288978 | 12/2009 |

OTHER PUBLICATIONS

Esam El-Araby et al, Space and Time Sharing of Reconfigurable Hardware forAccelerated Parallel Processing, NSF Center for High-Performance Reconfigurable Computing, The George Washington University, Washington, DC 20052, 12 Pages.

* cited by examiner

HARDWARE CONTROLLER TO CHOOSE SELECTED HARDWARE ENTITY AND TO EXECUTE INSTRUCTIONS IN RELATION TO SELECTED HARDWARE ENTITY

BACKGROUND

Hardware devices frequently include both hardware resources and hardware clients. Hardware resources can be conceptualized as those parts of a hardware device that are to perform processing, and thus which may be considered as "producers." By comparison, hardware clients can be conceptualized as those parts of a hardware device that are to generate tasks that are to be performed, and thus which may be considered as "consumers." A given component of a hardware device may be a hardware resource, a hardware client, or both a hardware resource and a hardware client.

DETAILED DESCRIPTION

Figure 1:
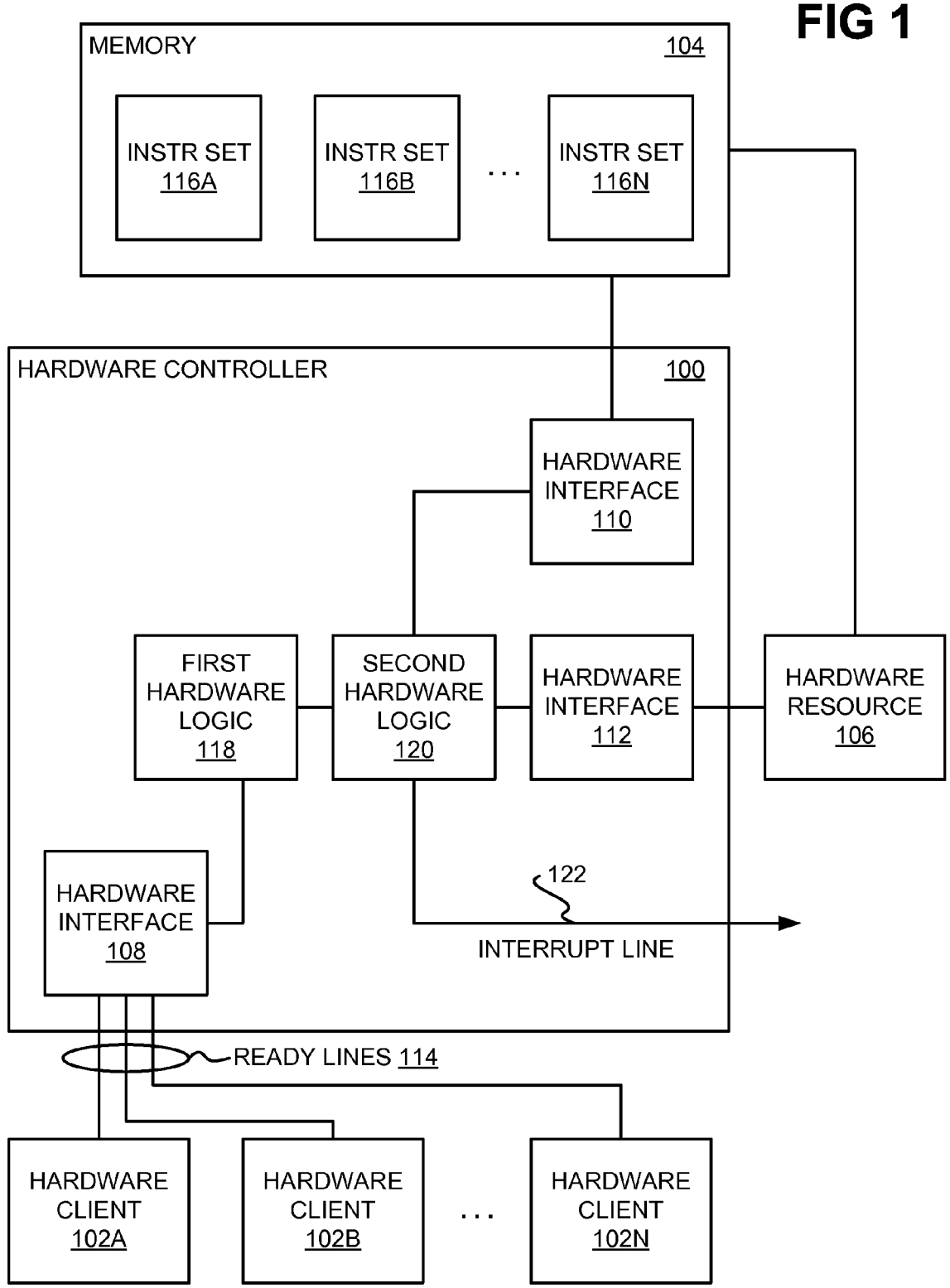
FIG. 1 is a diagram of a first example of a hardware controller.

As noted in the background section, a hardware device can include both hardware resources and hardware clients. In some situations, a number of hardware clients may have to have similar types of processing performed by the same hardware resource. Ideally, the hardware resource in question can be shared by the multiple hardware clients. However, hardware resource sharing is more easily achieved in theory than in practice.

One way to provide for hardware resource sharing is to implement a complicated communication protocol by which the hardware resource is able to field processing requests from multiple hardware clients, and return the results of the processing to the clients that requested the processing in question be performed. However, implementing such a communication protocol can add undesired overhead and complexity to the resulting hardware device. In many cases, it is simply easier to have a dedicated hardware resource of a given type for each hardware client in question.

Disclosed herein are approaches to share a hardware resource among multiple hardware clients, as well as for a hardware client to access multiple hardware resources of the same type, and a combination thereof, where there are both multiple clients and multiple resources. As one example, a hardware controller includes a first hardware interface to couple the controller to multiple hardware clients, and a second hardware interface to couple the controller to a memory to access instructions. The instructions can be divided among instruction sets corresponding to the clients, so that each client stores in the memory its corresponding instruction set.

The hardware controller further includes first hardware logic to choose a selected hardware client from the multiple hardware clients. For instance, the first hardware interface may include a number of ready lines corresponding to the hardware clients. When a hardware client has processing that it wishes to be performed, the client asserts a corresponding ready line. The first hardware logic thus chooses a selected hardware client from those hardware clients that have asserted their ready lines.

The hardware controller also includes second hardware logic to execute the instructions in relation to the selected hardware client. More specifically, the second hardware logic can execute the instruction set corresponding to the selected hardware client, for the selected client. The second hardware logic may, for instance, execute the instruction set in relation to a hardware resource shared by the hardware clients. In this respect, the hardware resource performs processing for the selected hardware client in accordance with execution of the instruction set by the second hardware logic.

For example, the instruction set may indicate that given data is to be copied into a hardware resource, and that the hardware resource is then to be launched to perform processing on this data. The second hardware logic therefor receives and performs the instructions. First, the second hardware logic performs, or causes to be performed, a copy operation to copy the relevant data into the hardware resource. Second, the second hardware logic then launches the hardware resource, such that the hardware resource performs processing on the data that has been previously copied into the hardware resource.

This approach to share a hardware resource among multiple hardware clients does not require any type of communication protocol, and thus does not require complicated and onerous overhead to perform. A hardware client simply stores the instruction set that the client wishes to have executed in a memory. The hardware controller then access the instruction set from the memory, and executes the instruction set, such that the hardware resource performs processing in accordance with the controller's execution of the instruction set.

The hardware controller can also be used for a hardware client to access multiple hardware resources of the same type. The first hardware interface of the hardware controller in this example is to couple the controller to the multiple hardware resources, where the second hardware interface again couples the controller to a memory to access instructions. The hardware client stores instructions to be executed for the client within the memory, also as before.

The first hardware logic of the hardware controller in this example is to choose a selected hardware resource from the multiple hardware resources. The second hardware logic then executes the instructions for the client, in relation to the selected hardware resource. For instance, the selected hardware resource is to perform processing in accordance with the hardware controller's execution of the instructions. In this way, the hardware client is availed of multiple hardware resources of the same type, even if it has not been programmed to do so.

FIG. 1 shows a first example of a hardware controller 100. The hardware controller 100 is implemented in hardware. For instance, the hardware controller 100 may be implemented as an application-specific integrated circuit (ASIC), a field-programmable array (FPGA), and so on. The hardware controller 100 is thus not implemented as software executed by a general-purpose processor, such as a central processing unit (CPU).

The hardware controller 100 is coupled to a number of hardware clients 102A, 102B, ..., 102N, collectively referred to as the hardware clients 102, as well as to a memory 104 and a hardware resource 106. There are at least two hardware clients 102 in the example of FIG. 1. The hardware clients 102 are also each implemented in hardware, such as an ASIC, an FPGA, and so on. The hardware clients 102 store instructions that are to be executed by the hardware controller 100, with potential assistance from the hardware resource 106. More specifically, the hardware clients 102A, 102B, ..., 102N store corresponding instruction sets 116A, 1168, ..., 116N, respectively, which are collectively referred to as the instruction sets 116, within the memory 104.

The hardware controller 100 includes one or more of a hardware interface 108, a hardware interface 110, and a hardware interface 112. The interfaces 108, 110, and 112 are hardware interfaces in that they are each implemented in hardware. The hardware interface 108 directly couples the hardware controller 100 to the hardware clients 102. For instance, the hardware interface 108 may be implemented as multiple ready lines 114, where each hardware client 102 uniquely corresponds to a ready line 114. When a hardware client 102 has stored its instruction set 116 that is to be executed by the hardware controller 100, the client 102 signals to the hardware controller 100 that the instruction set 116 is ready to be executed by signaling its corresponding ready line 114.

It is noted, however, that the hardware clients 102 may signal to the hardware controller 100 that their instruction sets 116 are ready to be executed in a manner other than by the use of ready lines 114 directly connecting the controller 100 to the clients 102. For instance, there may be a data bus by which the clients 102 signal this information to the hardware controller 100. Interrupt and other type of lines may also be employed.

The hardware interface 110 couples the hardware controller 100 to the memory 104. For instance, the hardware interface 110 may be a direct memory access (DMA) control mechanism. As such, the hardware controller 100 is able to quickly access the instruction sets 116 stored within the memory 104, without having to use a memory controller. Where the hardware interface 108 of FIG. 1 is absent, it is said that the hardware interface 110 subsumes the hardware interface 108, in that the hardware clients 102 are indirectly coupled to the hardware controller 100 via the memory 104 and the hardware interface 110.

The hardware interface 112 couples the hardware controller 100 to the hardware resource 106. The hardware resource 106 is also implemented in hardware, and may be implemented as an ASIC, an FPGA, and so on. The hardware resource 106 is able to perform processing in relation to the execution of an instruction set 116 by the hardware controller 100. For example, the hardware resource 106 may be adapted to perform one particular type of processing at a much higher speed than a general-purpose processor could achieve. The hardware resource 106 may be coupled to the memory 104.

In some scenarios, the hardware resource 106 may be absent. As such, the hardware interface 112 may correspondingly be absent as well. For example, if the hardware controller 100 is to execute the instruction set 116 without assistance from the hardware resource 106, then the resource 106 and the related hardware interface 112 may not be present.

The hardware controller 100 includes two types of hardware logic: first hardware logic 118 and second hardware logic 120. Each hardware logic 118 and 120 is implemented in hardware, insofar as the hardware controller 100 as a whole is. The first hardware logic 118 is to choose a selected hardware client 102 for which a corresponding instruction set 116 is to be accessed from the memory 104 and executed by the hardware controller 100. Where the hardware clients 102 are directly connected to the hardware controller 100 via the hardware interface 108, the first hardware logic 118 may choose the selected hardware client 102 from the hardware clients 102 that have asserted their ready lines 114.

The first hardware logic 118 may be programmed by one or more parameters that together specify the priority of the hardware clients 102 for selection purposes. As one example, the hardware clients 102 may have a given order of priority. If two or more hardware clients 102 assert their ready lines 114, then the hardware logic 118 may select the hardware client 102 that has higher priority. However, once processing for this hardware client 102 has finished, the hardware logic 118 may select the next higher priority client 102 that had asserted its ready line 114, instead of selecting an even higher priority client 102 that asserted its ready line 114 later in time. In this way, hardware clients 102 are not starved of processing even if they have relatively low priority.

The second hardware logic 120 is thus to execute the instruction set 116 corresponding to the selected hardware client 102, by accessing this instruction set 116 from the memory 104 via the hardware interface 110. Where the hardware resource 106 is present and is to assist the second hardware logic 120 in this respect, the hardware logic 120 accesses the hardware resource 106 through the hardware interface 112 to cause the hardware resource 106 to perform processing. This processing by the hardware resource 106 is in accordance with the execution of the instruction set 116 in question by the second hardware logic 120.

For example, an instruction set 116 may effectively be a script that indicates operations that are to be performed, and the order in which these operations are to be performed. The second hardware logic 120 executes the script in that it reads each operation that is to be performed, and correspondingly controls the hardware resource 106 to perform the specified operation. In this respect, the second hardware logic 120 effectively manages the hardware resource 106 on behalf of the selected hardware client 102.

When the second hardware logic 120 has finished execution of the instruction set 116 corresponding to the selected hardware client 102, the hardware logic 120 may signal such completion by asserting an interrupt on an outgoing interrupt line 122. Ultimately, the selected hardware client 102 receives confirmation that its corresponding instruction set 116 has been performed. The selected hardware client 102 then releases or clears its ready line 114. If the selected hardware client 102 has another instruction set 116 to be performed, then the hardware client 102 stores this new instruction set 116 within the memory 104, and again asserts its ready line 114.

In the example of FIG. 1, the hardware controller 100 permits a number of hardware clients 102 to share the same hardware resource 106, or otherwise have their instruction sets 116 executed by the same component (the hardware controller 100). However, the hardware controller 100 can also permit a hardware client 102 to utilize a number of hardware resources 106, which may be of the same type. In this respect, if the hardware client 102 has multiple instruction sets 116 that can be executed in parallel, multiple hardware resources 106 can be leveraged if available.

Figure 2:
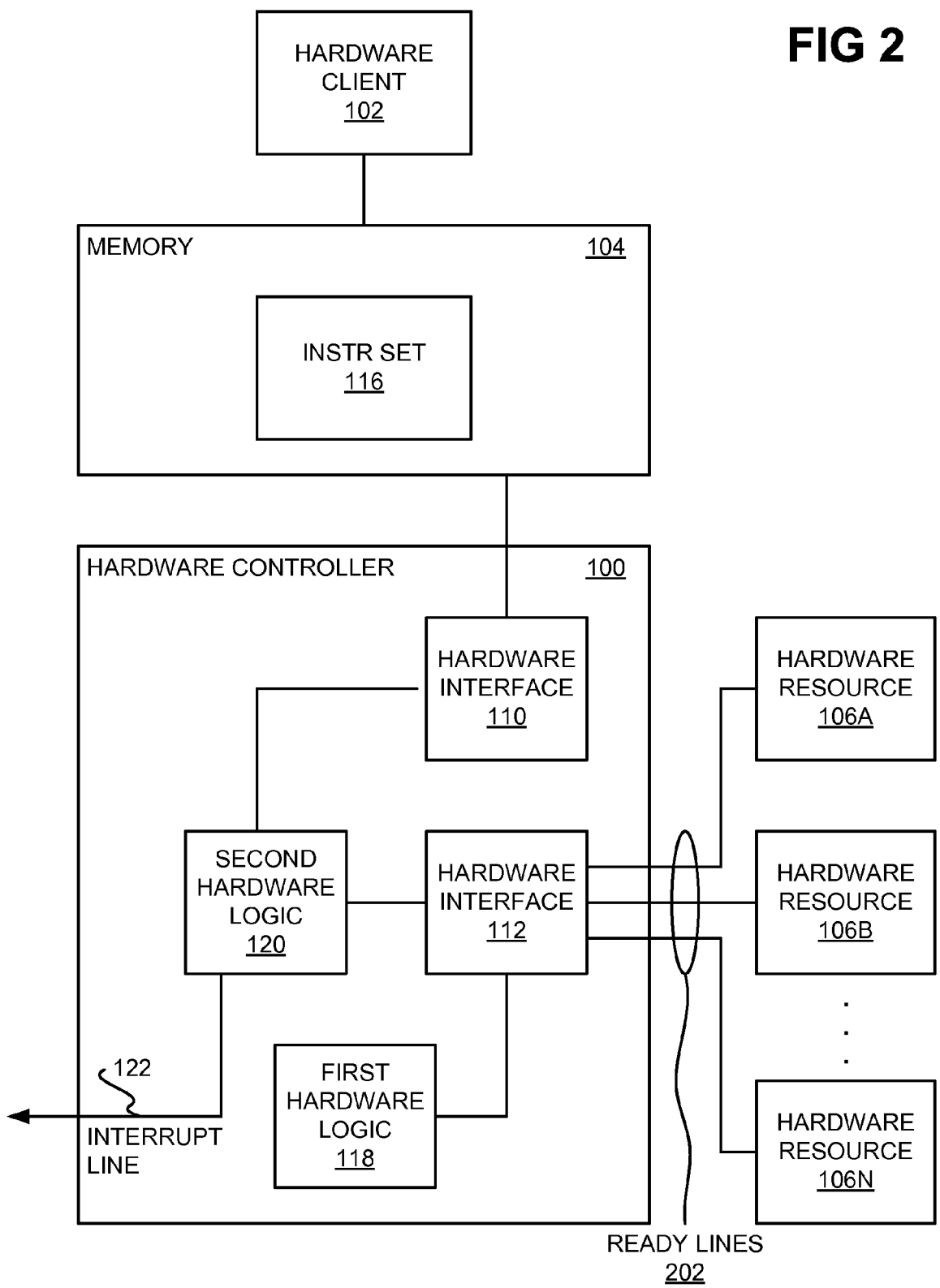
FIG. 2 is a diagram of a second example of a hardware controller.

FIG. 2 shows such a second example of the hardware controller 100. In the example of FIG. 2, just one hardware client 102 is depicted. By comparison, there are multiple hardware resources 106A, 106B, . . . , 106N, collectively referred to as the hardware resources 106. The hardware resources 106 may be of the same type, in that they are different instances of the same hardware component design, for instance. The hardware client 102 stores instructions that are to be executed by the hardware controller 100, with assistance from the hardware resources 106. The hardware client 102 thus stores an instruction set 116 within the memory 104.

The hardware controller 100 includes the hardware interfaces 110 and 112. As in the example of FIG. 1, the hardware interface 110 of FIG. 2 couples the hardware controller 100 to the memory 104. The hardware interface 112 couples the hardware controller 100 to the hardware resources 106. For instance, the hardware interface 108 may be implemented as multiple ready lines 202, where each hardware resource 106 uniquely corresponds to a ready line 202. When a hardware resource 106 is available to perform processing, the resource 106 signals this state to the hardware controller 100 by signaling its corresponding ready line 202.

It is noted, however, that the hardware resources 106 may signal to the hardware controller 100 that they are available to perform processing in a manner other than by the use of ready lines 106 directly connecting the controller 100 to the resources 106. For instance, there may be a data bus by which the hardware resources 106 signal this information to the hardware controller 100. Interrupt and other type of lines may also be employed.

Also as in the example of FIG. 1, the hardware controller 100 of FIG. 2 includes two types of hardware logic: first hardware logic 118 and second hardware logic 120. The first hardware logic 118 is to choose a selected hardware resource 106 that is to perform processing in correspondence with execution of the instruction set 116 of the hardware client 102. The first hardware logic 118 may choose the selected hardware resource 106 from the hardware resources 106 that have asserted their ready lines 202.

The first hardware logic 118 may be programmed by one or more parameters that together specify the priority of the hardware resources 106 for selection purposes. For example, the hardware resources 106 may perform the same type of processing, but may differ as to how fast they can perform this processing. As such, the hardware resources 106 may have a given order of priority in accordance with their performance capabilities. A faster hardware resource 106 may be selected before a slower hardware resource 106 if the faster hardware resource 106 is available.

The second hardware logic 120 is thus to execute the instruction set 116 for the hardware client 102, by accessing the instruction set 116 from the memory 104 via the hardware interface 110. The selected hardware resource 106 assists the second hardware logic 120 in this respect, by the second hardware logic 120 causing the selected hardware resource 106 to perform processing. This processing by the selected hardware resource 106 is in accordance with the execution of the instruction set 116 by the second hardware logic 120.

For example, as described above in relation to the example of FIG. 1, the instruction set 116 may in FIG. 2 also effectively be a script that indicates operations that are to be performed, and the order in which these operations are to be performed. The second hardware logic 120 executes the script in that it reads each operation that is to be performed, and corresponding controls the selected hardware resource 106 to perform the specified operation. In this respect, the selected hardware resource 106 assists the second hardware logic 120 in executing the instruction set 116.

When the second hardware logic 120 has finished execution of the instruction set 116 for the hardware client 102, the hardware logic 120 may signal such completion by asserting an interrupt on the outgoing interrupt line 122, as in the example of FIG. 1. Ultimately the selected hardware client 102 receives confirmation that its corresponding instruction set 116 has been performed. The selected hardware client 102 can store a new instruction set 116 within the memory 104, such that the hardware controller 100 again chooses a selected hardware resource 106 to assist with the execution of this new instruction set 116.

In the example of FIG. 2, the hardware controller 100 permits a number of hardware resources 106 to be shared by the same hardware client 102. As such, as instruction sets 116 are generated by the hardware client 102, the instruction sets 116 may be executed even before prior instruction sets 116 have had their execution completed. For example, the hardware controller 100 may execute a first instruction set 116 for the hardware resource 106A to perform processing in accordance with this first instruction set 116, and then execute a second instruction set 116 for the hardware resource 106B to perform processing in accordance with this second instruction set 116 before the hardware resource 106A has finished its processing.

A hardware controller 100 may be operable in one of two configurations. In the first configuration, the hardware controller 100 operates as in FIG. 1, in which multiple hardware clients 102 share a hardware resource 106. In the second configuration, the hardware controller 100 operates as in FIG. 2, in which multiple hardware resources 106 are shared by a hardware client 102.

Figure 3:
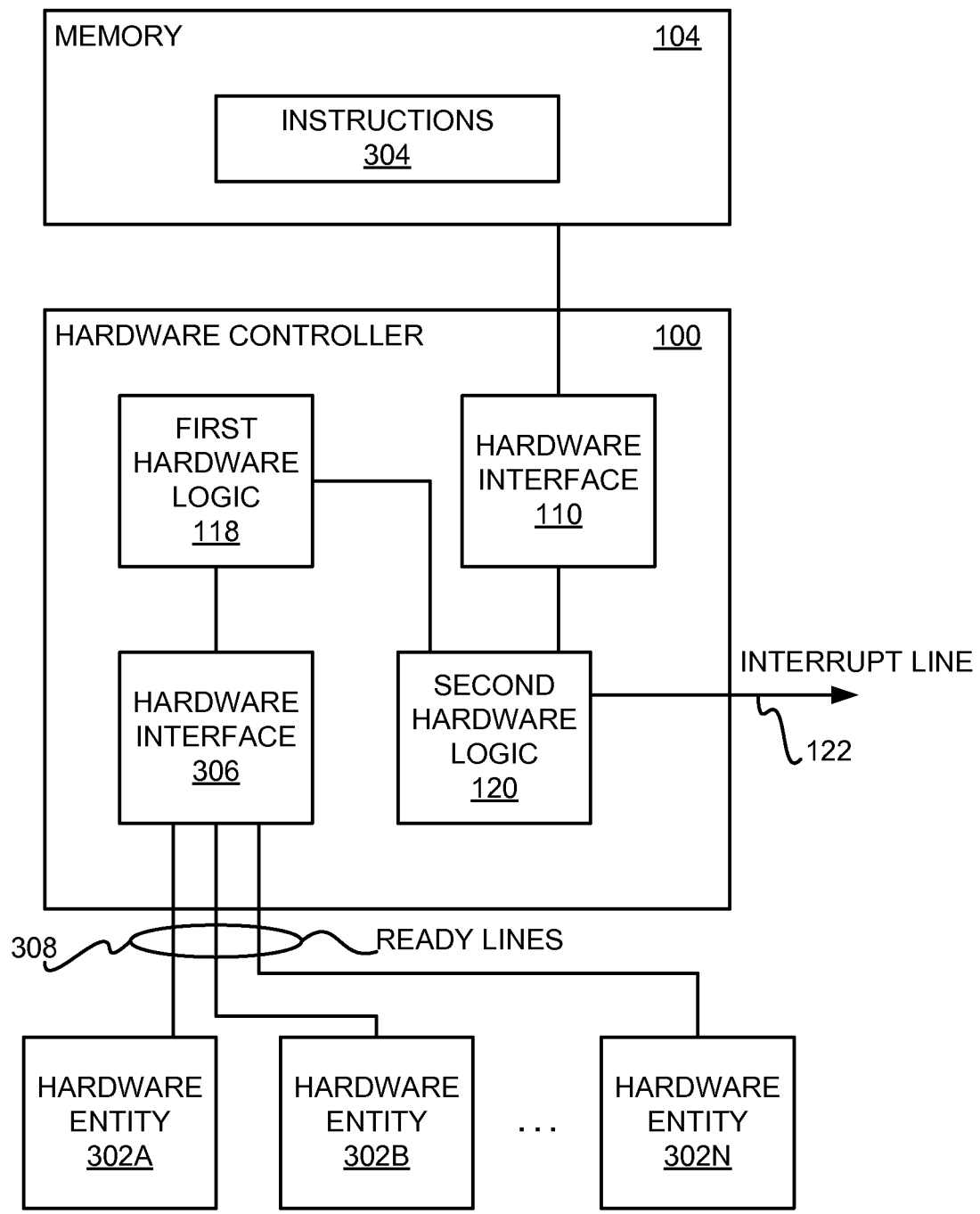
FIG. 3 is a diagram of a general example of a hardware controller that encompasses both the first and second examples of FIGS. 1 and 2.

FIG. 3 shows a general example of such a hardware controller 100 that can operate in accordance with these two configurations. The hardware controller 100 includes a hardware interface 306 that couples the controller 100 to what are referred to as hardware entities 302A, 302B, . . . , 302N, and which are collectively referred to as the hardware entities 302. The hardware interface 306 may be implemented as a number of ready lines 308 that correspond to the hardware entities 302.

In the first configuration, the hardware entities 302 of FIG. 3 are the hardware clients 102 of FIG. 1. As such, the hardware interface 306 of FIG. 3 is the hardware interface 108 of FIG. 1, and the ready lines 308 of FIG. 3 are the ready lines 114 of FIG. 1. In the second configuration, the hardware entities 302 of FIG. 3 are the hardware resources 106 of FIG. 2. As such, the hardware interface 302 is the hardware interface 112 of FIG. 2, and the ready lines 308 of FIG. 3 are the ready lines 202 of FIG. 2.

As before, the hardware controller 100 includes the hardware interface 110 to couple the controller 100 to the memory 104. The memory 104 stores instructions 304, which can be implemented as the instruction sets 116 of FIGS. 1 and 2 that have been described. Also as before, the hardware controller 100 includes the first hardware logic 118 and the second hardware logic 120 that have been described, as well as the outgoing interrupt line 122 that has also been described.

It is noted that the two configurations of the hardware controller of FIG. 3 that have been described in relation to FIGS. 1 and 2 can be combined. For example, there may be multiple hardware clients 102 and multiple hardware resources 106. As such, a selected hardware client 102 is chosen, as well as a selected hardware resource 106 to perform processing for the selected hardware client 102.

Figure 4A:
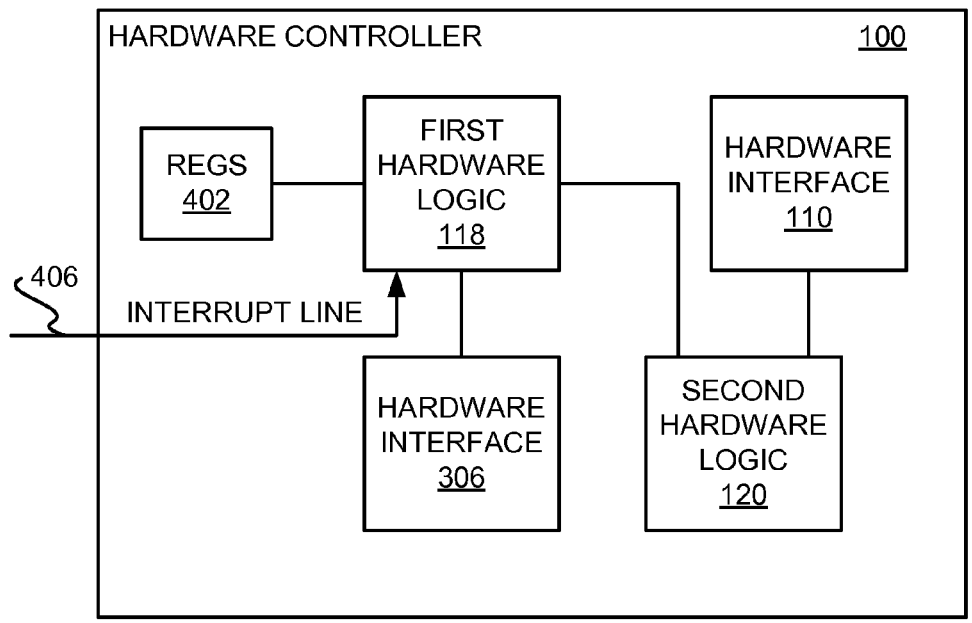
FIGS. 4A and 4B are diagrams depicting two examples of how the hardware controller of FIG. 3 can be programmed.
Figure 4B:
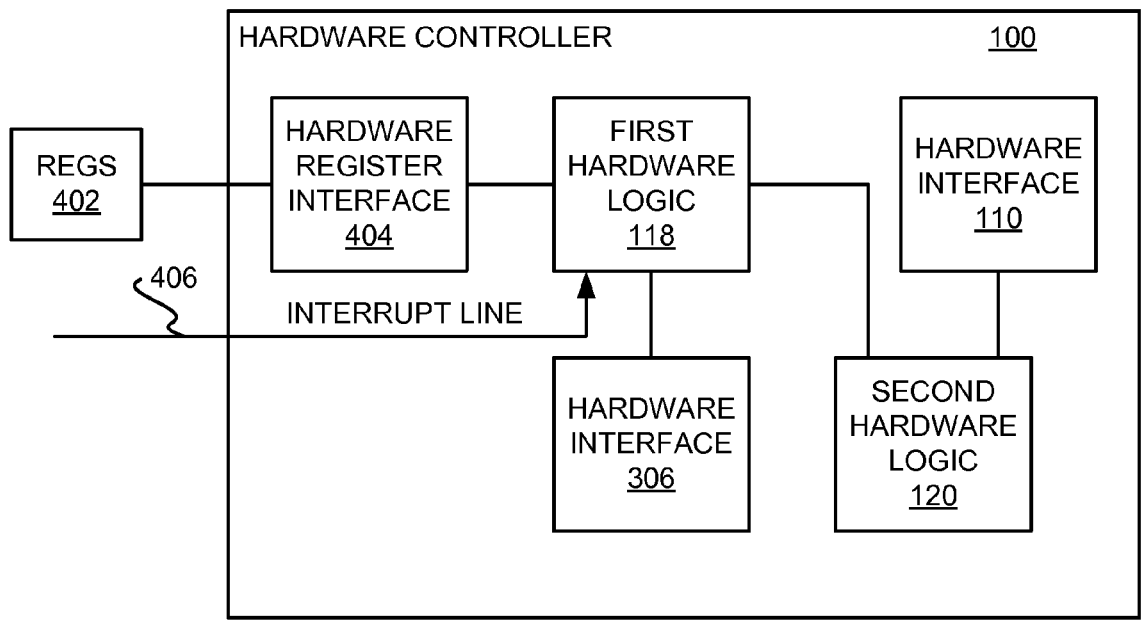

FIGS. 4A and 4B show two examples by which the first hardware logic 118 of the hardware controller 100 can be programmed. As noted above, the first hardware logic 118 is programmed by one or more parameters, which together specify the priority of the hardware entities 302—i.e., the hardware clients 102 of FIG. 1 or the hardware resources 106 of FIG. 2—for selection purposes. The parameters may be set to specify different types of priority logic in this respect, to specify which hardware entities 302 have greater priority, and/or may to specify another manner in which the first hardware logic 118 is programmed. The hardware entities 302 themselves, as well as the memory 104, are not depicted in FIGS. 4A and 4B for illustrative convenience and clarity, although the constituent components of the hardware controller 100 are depicted in FIGS. 4A and 4B for illustrative completeness.

In FIG. 4A, the hardware controller 100 includes a number of registers 402 to store these parameters on which basis the first hardware logic 118. The first hardware logic 118 is connected to and accesses the registers 402 to determine how to select the hardware entities 302. By comparison, in FIG. 4B, the registers 402 are located external to the hardware controller 100. As such, the hardware controller 100 includes a hardware register interface 404 connected to the first hardware logic 118, so that the hardware logic 118 can access the registers 402 to determine how to select the hardware entities 302.

In both FIGS. 4A and 4B, the hardware controller 100 includes an incoming interrupt line 406. After the parameters have been appropriately stored in the registers 402 to effectively program the first hardware logic 118, an interrupt is asserted on the interrupt line 406. This signals to the first hardware logic 118 to commence selecting the hardware entities 302, in accordance with FIG. 1 or 2 depending on the configuration of the hardware controller 100. However, a mechanism other than an interrupt line 406 may be employed to perform this signaling, such as a data bus, a register, and so on.

Figure 5:
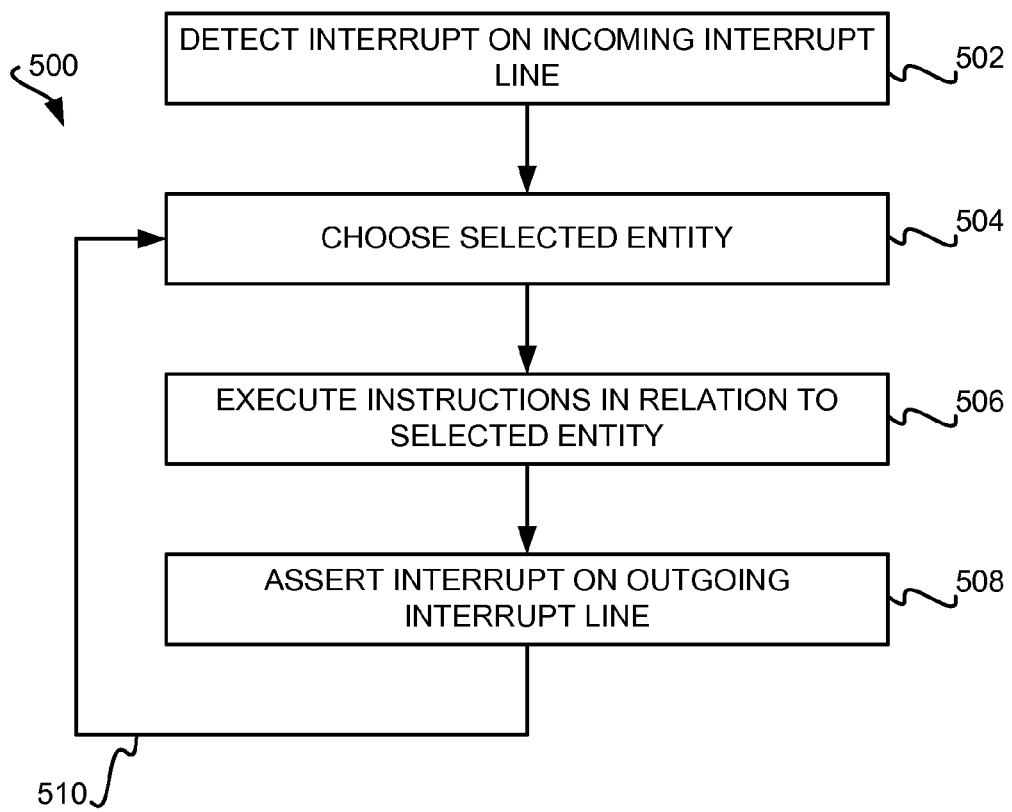
FIG. 5 is a flowchart of an example method for using the hardware controller of FIG. 3.

FIG. 5 shows an example method 500 of use of the hardware controller 100 of FIG. 3. The first hardware logic 118 of the hardware controller 100 detects an interrupt on the interrupt line 406 (502). In response, the first hardware logic 118 chooses a selected hardware entity 302 from the hardware entities 302 to which the hardware controller 100 is coupled via the hardware interface 306 (504). The second hardware logic 118 of the hardware controller 100 executes the instructions 304 from the memory 104, as accessed through the hardware interface 110, in relation to the selected entity 302 (506). Once the instructions 304 have been executed, the second hardware logic 118 asserts an interrupt on the outgoing interrupt line 122 to signal completion (508). The method 500 can then be repeated at part 504, as indicated by the arrow 510.

More specifically, in the first configuration of the hardware controller as in FIG. 1, the hardware entities 302 are hardware clients 102, as has been described. The instructions 304 are thus divided over instruction sets 116, where each hardware client 102 stored in the memory 104 the instruction set 116 to which the hardware client 102 in question corresponds. As such, in part 504 the first hardware logic 118 chooses a selected hardware client 102. In part 506 the second hardware logic 120 executes the instruction set 116 corresponding to this selected hardware client 102. Where the hardware resource 106 of FIG. 1 is present and to be used, the hardware logic 120 causes the hardware resource 106 to perform processing for the selected hardware client 102 in accordance with the execution of the instruction set 116 in question.

By comparison, in the second configuration of the hardware controller 100 as in FIG. 2, the hardware entities are hardware resources 106, as has also been described. As such, in part 504 the first hardware logic 118 chooses a selected hardware resource 106. In part 506 the second hardware logic 118 executes the instructions 304 for a hardware client 102, which may still be in the form of an instruction set 116. Specifically, the hardware logic 118 causes the selected hardware resource 106 to perform processing for this hardware client 102 in accordance with the execution of the instructions 304.

Figure 6:
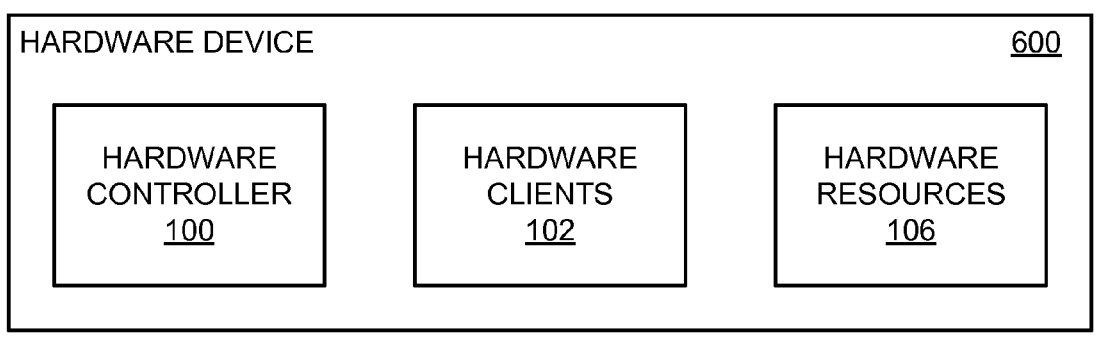
FIG. 6 is a diagram of an example hardware device including the hardware controller of FIG. 3.

In conclusion, FIG. 6 shows an example and rudimentary hardware device 600. The hardware device 600 includes the hardware controller 100, as well as the hardware clients 102 and the hardware resources 106. The hardware device 600 may be an image-forming device, such as a printing device, or another type of device, such as a computing device like a general-purpose computer, among other types of hardware devices.

For example, the hardware device 600 may be a color printing device that forms images on media like paper in full color. The printing device may have a number of different colorants, such as cyan, magenta, yellow, and black. Color processing is performed to convert full color image data to each such color, and the colorant of each color is output onto the media separately by one or more print engines. For a given portion of the image data, such as a given line thereof, the different colorants may be output onto the media at different times.

Therefore, conventionally there may be four hardware resources to convert the full color image data to each color of colorant. However, the hardware resources are typically able to perform processing much more quickly than the print engines are able to output colorant onto the media. As such, the hardware device 600 can include the hardware controller 100 and one hardware resource 106 to convert the image data to a particular color of colorant. There are four hardware clients 102 in this example, corresponding to the different colors of colorants, and which specifically are image processing blocks, such as halftoning blocks, color conversion blocks, color separation blocks, and so on. The hardware resource 106 is shared by the hardware clients 102, as in the first configuration of the hardware controller 100 in FIG. 1.

This example thus shows how the same hardware resource 106 can be leveraged for different hardware clients 102 by using the hardware controller 100. As such, the resulting hardware device 600 will typically be able to be manufactured less expensively than a hardware device that includes four instances of the same hardware resource 106 for the four hardware clients 102. Furthermore, the hardware resource 106 itself does not have to be redesigned. The hardware resource 106 is still processing one color at any given moment in time no different than if the resource 106 were dedicated to one color, but over a given period of time is processing the four different colors, insofar as it is shared by the four hardware clients 102.

As such, the techniques disclosed herein provide for fast execution by the hardware resources 106 on behalf of the hardware clients 102. This is because parallelism is provided for. That is, a given hardware client 102 may have processing performed for it by a hardware resource 106 at the same time as another hardware client 102 has processing performed for it by a different hardware resource 106.

We claim:

1. A hardware controller comprising:
   a first hardware interface to couple the hardware controller to a plurality of hardware entities of a hardware device in which the hardware controller is to be included;
   a second hardware interface to couple the hardware controller to a memory to access instructions;
   first hardware logic to choose a selected hardware entity from the hardware entities; and,
   second hardware logic to execute the instructions in relation to the selected hardware entity,
   wherein in a first configuration, the hardware entities comprise a plurality of hardware clients, the instructions are divided among instruction sets corresponding to the hardware clients, each client to store in the memory the instruction set that the second hardware logic is to execute for the client, and the second hardware logic is to execute the instruction set corresponding to the client that is the selected hardware entity for the client that is the selected hardware entity,
   and wherein in a second configuration, the hardware entities comprise a plurality of hardware resources, the instructions correspond to a client that is to store in the memory the instructions that the second hardware logic is to execute for the client, and the second hardware logic is to execute the instructions for the client and in relation to the hardware resource that is the selected hardware entity, such that the hardware resource that is the selected hardware entity is to perform processing in accordance with execution of the instructions by the second hardware logic.

2. The hardware controller of claim 1, wherein, in the first configuration, in executing the instruction set corresponding to the client that is the selected hardware entity, the second hardware logic is to execute the instruction set in relation to a hardware resource shared by the hardware clients, such that the hardware resource is to perform processing for the client that is the selected hardware entity in accordance with execution of the instruction set by the second hardware logic.

3. The hardware controller of claim 1, wherein the first hardware interface comprises a plurality of hardware ready lines corresponding to the hardware entities,
   and wherein the first hardware logic is to choose the selected hardware entity from the hardware entities that have asserted the hardware ready lines.

4. The hardware controller of claim 1, further comprising a plurality of registers, the registers storing parameters on which basis the first hardware logic is to choose the selected hardware entity from the hardware entities.

5. The hardware controller of claim 1, further comprising a hardware register interface to couple the hardware controller to a plurality of registers, the registers storing parameters on which basis the first hardware logic is to choose the selected hardware entity from the hardware entities.

6. The hardware controller of claim 1, further comprising an outgoing interrupt line to signal an interrupt that execution of the instructions by the second hardware logic has been completed.

7. The hardware controller of claim 1, further comprising an incoming interrupt line to receive an interrupt that the first hardware logic is to commence choosing the selected hardware entity.

8. A method comprising:
   choosing, by first hardware logic of a hardware controller, a selected hardware entity from a plurality of hardware entities coupled to the hardware controller by a first hardware interface of the hardware controller, the hardware entities and the hardware controller part of a hardware device; and,
   executing instructions in relation to the selected hardware entity, by second hardware logic of the hardware controller, the instructions stored in a memory to which the hardware controller is coupled by a second hardware interface of the hardware controller,
   wherein in a first configuration, the hardware entities comprise a plurality of hardware clients, the instructions are divided among instructions sets corresponding to the hardware clients, each client storing in the memory the instruction set that the second hardware logic is to execute for the client, and executing the instructions in relation to the selected hardware entity comprises executing the instruction set corresponding to the client that is the selected hardware entity for the client that is the selected hardware entity,
   wherein in a second configuration, the hardware entities comprise a plurality of hardware resources, the instructions correspond to a client that stores in the memory the instructions that the second hardware logic is to execute for the client, and executing the instructions in relation to the selected hardware entity comprises executing the instructions for the client and in relation to the hardware resource that is the selected hardware entity, such that the hardware resource that is the selected hardware entity performs processing in accordance with execution of the instructions by the second hardware logic.

* * * * *